(12) United States Patent
Lalancette et al.

(10) Patent No.: US 6,808,079 B2
(45) Date of Patent: Oct. 26, 2004

(54) ELECTRICAL OUTLET BOX

(75) Inventors: Daniel Lalancette, L'Acadie (CA); Tomasz Bedkowski, Sutton (CA); Michele Di Lillo, Laprairie (CA)

(73) Assignee: Thomas & Betts International, Inc., Wilmington, DE (US)

( * ) Notice: Subject to any disclaimer, the term of this patent is extended or adjusted under 35 U.S.C. 154(b) by 69 days.

(21) Appl. No.: 10/306,542

(22) Filed: Nov. 27, 2002

(65) Prior Publication Data

US 2004/0099661 A1 May 27, 2004

(51) Int. Cl.$^7$ ................................................. H02G 3/08
(52) U.S. Cl. ........................................ 220/3.3; 220/3.9
(58) Field of Search .......................... 220/3.3, 3.9, 3.7; 174/66, 67

(56) References Cited

U.S. PATENT DOCUMENTS

| | | | |
|---|---|---|---|
| 1,154,576 A | 9/1915 | Maison et al. | |
| 1,961,728 A | 6/1934 | Arnest et al. | |
| 2,214,968 A | 9/1940 | MacMillen | |
| 2,556,061 A | 6/1951 | Buckels | |
| 2,730,261 A | 1/1956 | Tutt | |
| 2,757,817 A | 8/1956 | Egan | |
| 2,879,912 A | 3/1959 | Appleton | |
| 2,989,206 A | 6/1961 | McAfee | |
| 3,609,647 A | * 9/1971 | Castellano | 439/535 |
| 3,651,245 A | 3/1972 | Moll | |
| 3,676,571 A | 7/1972 | Rubinstein | |
| 3,876,821 A | 4/1975 | Pringle | |
| 3,955,463 A | 5/1976 | Hoehn | |
| 4,012,580 A | 3/1977 | Arnold | |
| 4,032,030 A | 6/1977 | Bass et al. | |
| 4,103,125 A | * 7/1978 | Marrero | 200/51 R |
| 4,165,010 A | 8/1979 | Nattel | |
| 4,214,667 A | 7/1980 | Lass | |

(List continued on next page.)

FOREIGN PATENT DOCUMENTS

| | | |
|---|---|---|
| CA | 2127073 | 9/1995 |
| CA | 2139172 | 6/1996 |

OTHER PUBLICATIONS

U.S. patent application Ser. No. 10/178,403, Brian MacDonald, filed Jun. 24, 2002.
U.S. patent application Ser. No. 10/205,925, Daniel Lalancette, Tom Beckowski, filed Jul. 26, 2002.

Primary Examiner—Joseph Man Moy
(74) Attorney, Agent, or Firm—Hoffmann & Baron, LLP

(57) ABSTRACT

An electrical outlet box having a rear wall parametrically bound by an orthogonally extending sidewall terminating at a rim defining an opening in the outlet box. The sidewall includes a generally planar mounting surface adapted to be abutted against a structural support. The mounting surface includes an aperture centrally disposed between a pair of prongs, and the prongs being securable within the support structure for temporarily securing the outlet box thereto without the need for a fastener. The aperture is adapted to receive a fastener for operatively securing the outlet box to the support structure.

18 Claims, 6 Drawing Sheets

U.S. PATENT DOCUMENTS

| | | | |
|---|---|---|---|
| 4,311,422 A | 1/1982 | Jackovitz | |
| 4,642,420 A | 2/1987 | Nattel | |
| 4,842,156 A | 6/1989 | Nattel | |
| 4,863,399 A | 9/1989 | Medlin, Jr. | |
| 4,865,556 A | 9/1989 | Campbell et al. | |
| 4,936,396 A | 6/1990 | Lockwood | |
| 4,983,785 A | 1/1991 | Johnston | |
| 5,072,848 A | 12/1991 | Pipis et al. | |
| 5,158,478 A | 10/1992 | Schuplin | |
| 5,170,013 A | 12/1992 | Borsh et al. | |
| 5,170,014 A | 12/1992 | Borsh | |
| 5,211,580 A | 5/1993 | Schuplin | |
| 5,382,755 A * | 1/1995 | Correnti | 174/67 |
| 5,449,860 A * | 9/1995 | Buckshaw et al. | 174/67 |
| 5,579,939 A | 12/1996 | Bourassa | |
| 5,594,208 A | 1/1997 | Cancellieri et al. | |
| 5,595,362 A | 1/1997 | Rinderer et al. | |
| 5,601,455 A | 2/1997 | Bagga | |
| 5,603,424 A | 2/1997 | Bordwell et al. | |
| 5,703,327 A | 12/1997 | Jorgensen | |
| 5,744,753 A | 4/1998 | Nattel | |
| 5,810,303 A | 9/1998 | Bourassa et al. | |
| 5,853,098 A | 12/1998 | Elder | |
| 5,932,844 A | 8/1999 | MacAller et al. | |
| 5,939,844 A | 8/1999 | Shiomi et al. | |
| 6,101,731 A * | 8/2000 | Mesa | 33/528 |
| 6,107,568 A | 8/2000 | Schnell et al. | |
| 6,188,020 B1 | 2/2001 | Osterbrock et al. | |
| 6,410,851 B1 | 6/2002 | Lamar et al. | |
| 6,423,898 B1 | 7/2002 | Croker | |

* cited by examiner

ELECTRICAL OUTLET BOX

FIELD OF THE INVENTION

The present invention relates to an outlet box, more specifically to an electrical outlet box for providing a housing for wiring connection.

BACKGROUND OF THE INVENTION

Electrical outlet boxes are commonly used for connecting various wires at a fixed location or for attaching a fixture such as a light switch or other type of switch or mechanism to electrical wires routed throughout a building. Outlet boxes are typically attached to a wood or metal wall stud. The outlet box must be properly positioned in relation to the stud itself and the outer covering which is later placed over the stud. Typically, the outer covering placed on the stud is a gypsum board material, therefore, the outlet box must be positioned so that it is properly recessed within the outer covering to allow for the outlet box to be accessed. Outlet boxes of the prior art can be in the shape of a rectangular box which has an opening positioned adjacent the stud so that the outer covering to the wall can have an aperture cut within it so that the inside of the outlet box can be accessed.

Outlet boxes are subjected to various forces such as when an electrical plug outlet is housed in the outlet box. The force of inserting and removing a plug from the plug outlet subjects the outlet box to various torque forces such that the box must be properly secured to resist inadvertent removal of the outlet box from the stud. Prior designs typically use at least two fasteners, such as a screw or a nail, which are inserted through openings in the sidewall of the outlet box so that the outlet box can be attached to the stud.

A problem associated with prior design is that in order to properly position the outlet box and attach it to a stud the user must insert two fasteners. During the construction of a building or residence many outlet boxes may have to be installed. The process of using these two fasteners is both time consuming and expensive as it is difficult to properly position the two fasteners to hold the box in place.

An example of one such outlet box is U.S. Pat. No. 5,579,939 to Bourassa which shows an outlet box that requires two fasteners to it to a stud. The outlet box of Bourassa shows that a set of first tabs 52 are used to position the box on the resting plane of the stud and a second pair of sharp tabs 54 are used to penetrate the side of the stud. However the Bourassa box utilizes the holes adjacent the tabs 52 or tabs 54 to secure the box to the stud. The problem associated with this design is that multiple fasteners are needed to secure the box to the stud. The fasteners are positioned directly adjacent the tabs 52 or 54 and still allow for pivotal movement of the box about the tabs 52 or 54 if less than two fasteners are used.

One problem associated with this two fastener method is that it takes a skillful worker to properly position one fastener and then position a second fastener so that the outlet box does not pivot around the first fastener. This process is also expensive as buildings typically require hundreds of these outlet boxes to be installed by an electrician having relatively high labor costs. Accordingly, the ability to reduce the time associated with mounting these boxes is highly desirable.

Accordingly, it would be desirable to provide an outlet box which facilitates the attachment of the box to a stud. There is also a further need for an outlet box which assists the user in properly positioning the outlet for attachment so that the time associated with installing the outlet box is shorter and more cost efficient.

SUMMARY OF THE INVENTION

The present invention is an electrical outlet box having a rear wall parametrically bound by an orthogonally extending sidewall terminating at a rim defining an opening and an interior to the outlet box. The sidewall includes a generally planar mounting surface adapted to be abutted against a structural support, such as a wall stud. The mounting surface including an aperture centrally disposed between a pair of prongs that are securable within the support structure for temporarily securing the outlet box thereto without the need for a fastener. The aperture is adapted to receive a fastener for operatively securing the outlet box to the support structure.

In a preferred embodiment the outlet box further includes a pair of positioning tabs extending from the mounting surface to assist in positioning the outlet box in relation to the structural support. The positioning tabs are aligned along a first longitudinal axis. The sidewall can include a raised portion to form the mounting surface where the holding prongs extend therefrom and are pointed to assist in piercing an outer surface of the structural support. The holding prongs are aligned along a second longitudinal axis of the mounting surface and are spaced a distance away from the positioning tabs. The aperture can be located equidistant from each of the prongs and the prongs are aligned in a substantially first linear axis and the aperture is positioned a distance away from the first linear axis in a substantially parallel second axis.

An advantage of the present design is that only one fastener is needed to hold the outlet box onto a stud, thus, eliminating the excess time and materials needed.

A further advantage of the present invention is that the positioning tabs assist in positioning the outlet box in relation to the stud, thus, less training is needed to mount the box.

A still further advantage of the present invention is that the holding prongs temporarily hold the outlet box in place while the user operatively affixes the box to the stud.

A preferred form of the outlet box, as well as other embodiments, objects, features and advantages of the present invention will be apparent from the following detailed description of illustrative embodiments thereof, which will be in conjunction with the accompanying drawings.

DETAILED DESCRIPTION OF THE PREFERRED EMBODIMENT

Figure 1:
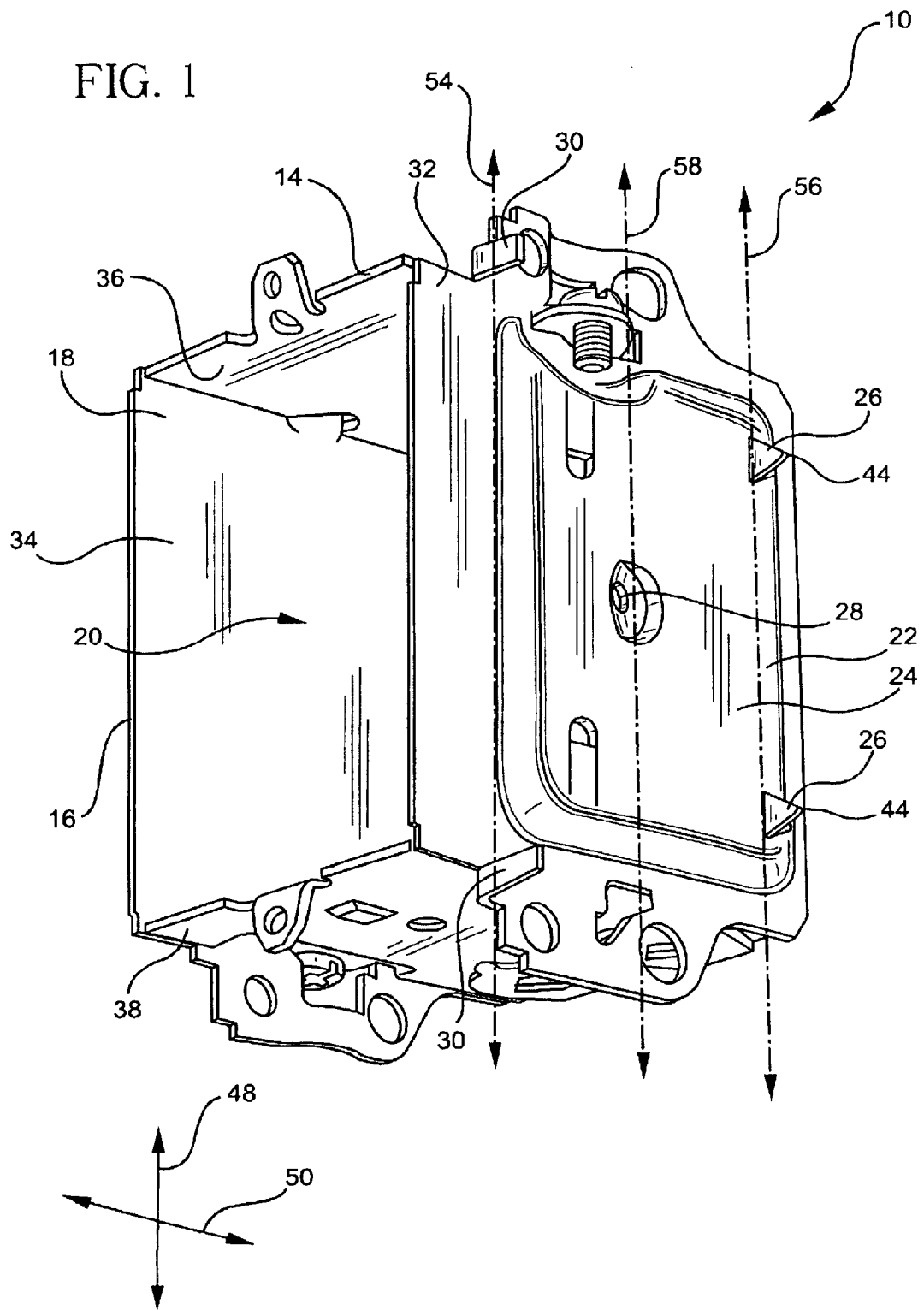
FIG. 1 is a side perspective view of the outlet box of the present invention.

The outlet box 10 of the present invention provides a housing for electrical wiring termination and electrical outlets and switches. The housing is able to be easily securable to a structural support 8, such as a stud, and allows for the quick and efficient attachment of the outlet box 10.

Referring to FIGS. 1–6, outlet box 10 has a rear wall 12 parametrically bound by an orthogonally extending sidewall 14 terminating at a rim 16 that defines an opening 18 in the outlet box 10. The sidewall 14 and rear wall 12 form an interior 20 to the outlet box 10. The outlet box 10 further includes a mounting surface 22 on the sidewall 14 that is generally planar and is adapted to abut against a structural support 8. Mounting surface 22 can include a pair of prongs 26 that are securable within the structural support 8 for temporarily holding the outlet box 10 to the structural support 8. There is also an aperture 28 centrally disposed between the prongs 26 that is adapted to receive a fastener 46 for operatively securing the outlet box 10 to the structural support 8.

In a preferred embodiment, the sidewall 14 is divided up into four individual sidewalls to form a rectangular box, however, it is envisioned that any shape outlet box 10 can be configured. A first wall 32 extends from the rear wall 12 and has an oppositely positioned and substantially parallel second wall 34. A third wall 36 connects the first wall 32 and second wall 34 and is substantially perpendicular to the first wall 32 and second wall 34. An oppositely positioned fourth wall 38 connects the first wall 32 and second wall 34. The outlet box 10 can be made of a metal such as steel, however, it is also possible that a high strength plastic can also be used.

Figure 2:
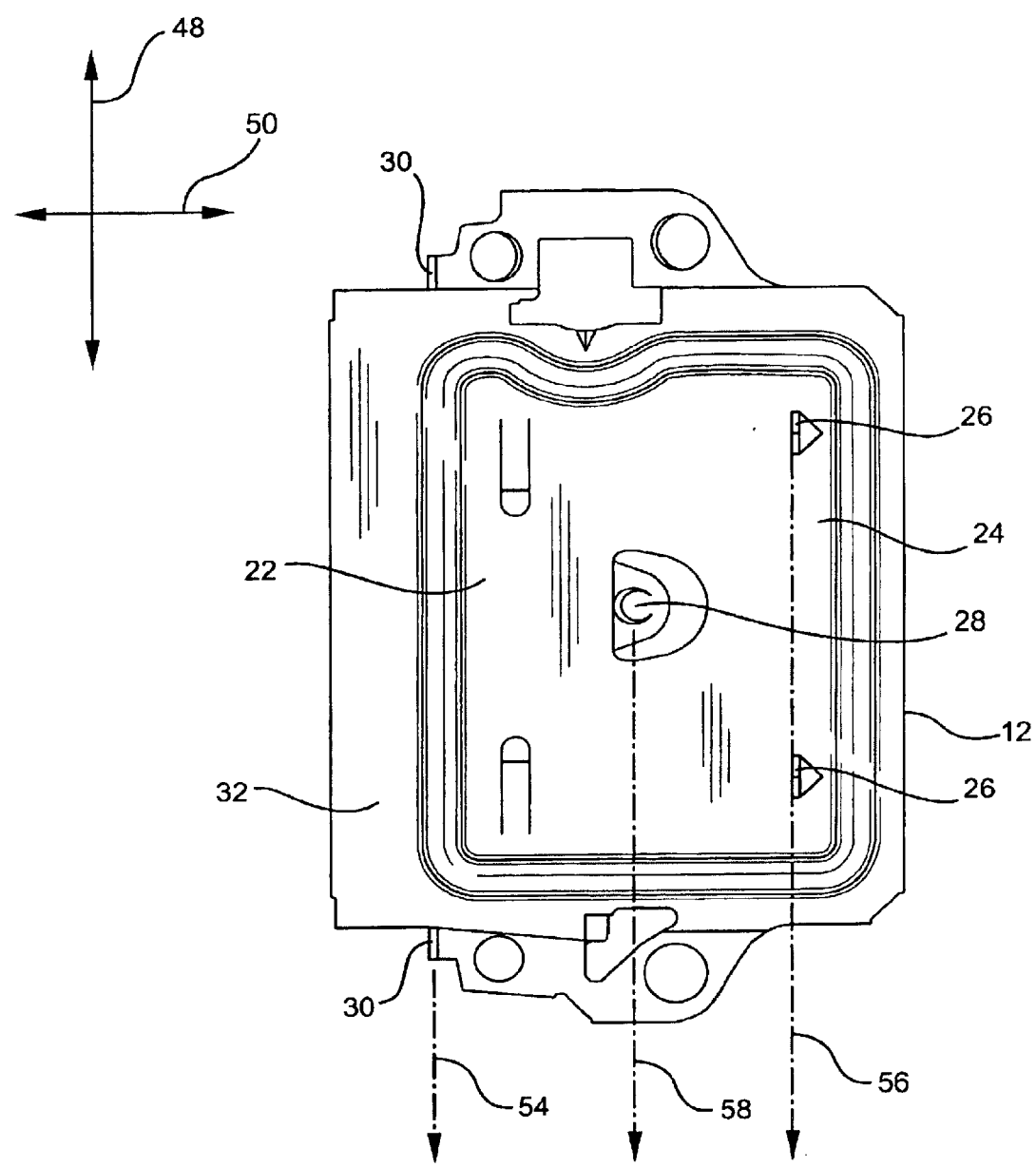
FIG. 2 is a side elevational view of the outlet box of FIG. 1.
Figure 3:
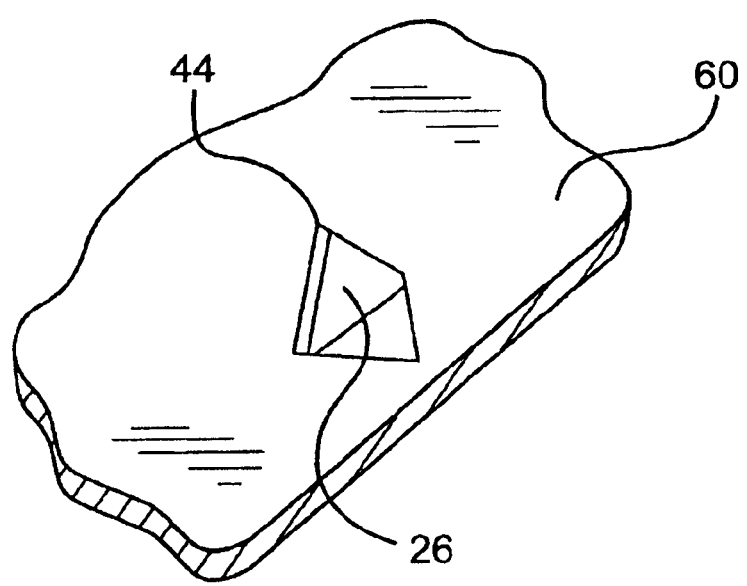
FIG. 3 is a partial perspective view of a holding prong of the outlet box as shown in FIG. 1.
Figure 4:
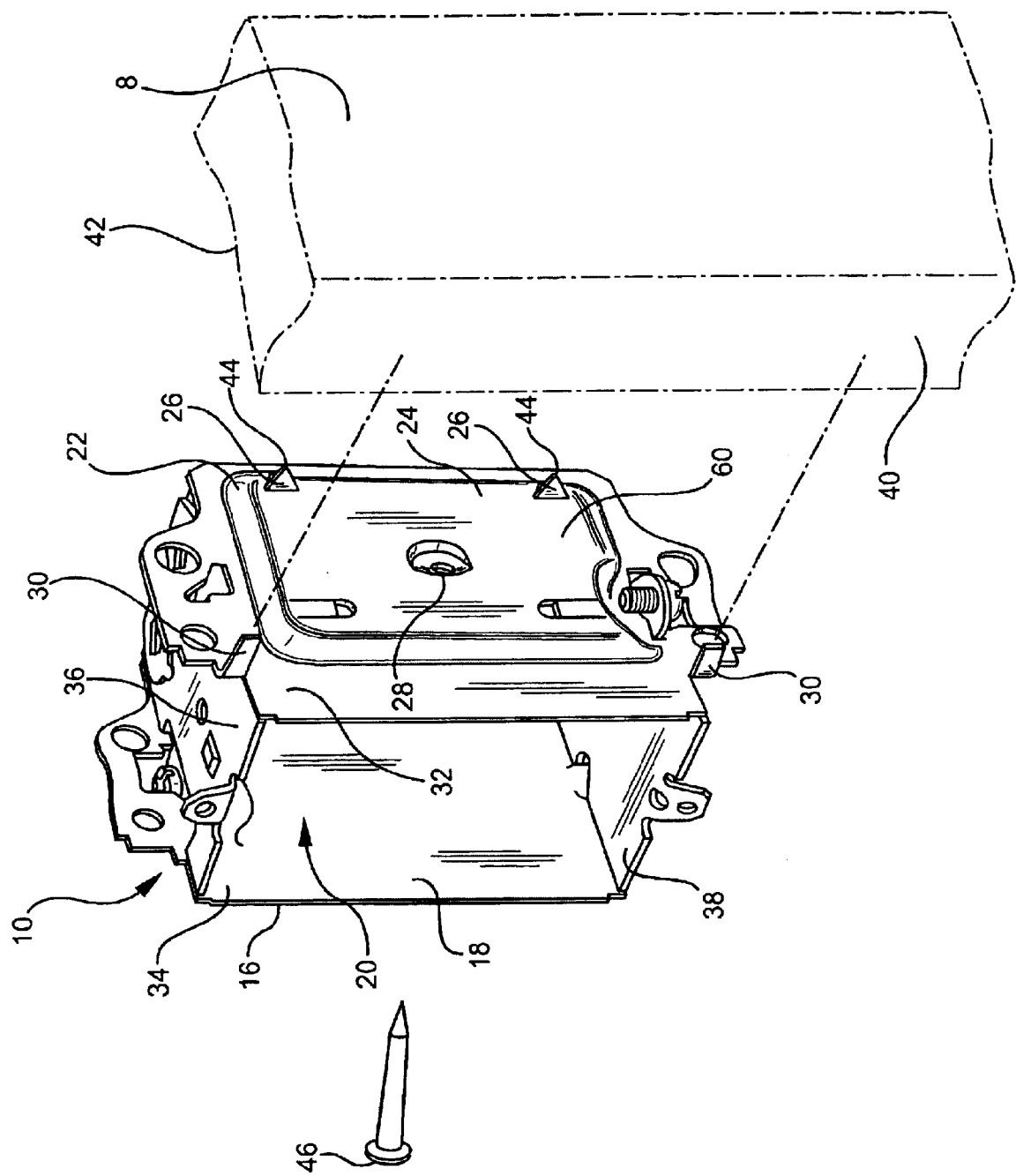
FIG. 4 is an exploded perspective view of the outlet box of the present invention attached to a stud.

Referring specifically to FIGS. 1 and 2, first wall 32 has at least one positioning tab 30 extending substantially perpendicularly therefrom. In a preferred embodiment there are two positioning tabs 30 which may be rectangular shaped. The positioning tabs 30 assist in positioning the outlet box 10 on the structural support 8. The positioning tabs 30 are preferably linearly aligned along a first longitudinally extending axis 54 on the outlet box 10 to allow the opening 18 of the outlet box 10 to be placed in the proper position in relation to the stud 8. When positioning tabs 30 are placed on the front face 40 of the stud, the outlet box opening 18 is positioned such that the outlet box rim 16 will project through the outer wall covering when the outer wall covering is placed over the stud 8. The outer wall covering can be a material such as gypsum board so that the outlet box 10 will project therethrough. The positioning tabs 30 permit an installer to correctly position and align the outlet box 10 in relation to the stud 8.

Sidewall 14 has a mounting surface 22 that abuts against the stud 8 when the outlet box 10 is mounted thereto. Referring to FIGS. 1–5 the mounting surface 22 can be disposed on the first wall 32. First wall 32 has a raised portion 24 forming the mounting surface 22 that can be a stamped or a drawn portion of first wall 32. The raised portion 24 can be used to allow the outlet box opening 18 to be positioned a distance D1 away from the stud 8 and allows for a larger interior 20 of outlet box 10 to facilitate use. The outer surface 60 of the raised portion 24 preferably contacts the side surface 42 of the stud 8. The raised portion 24 can include at least one holding prong 26 therefrom. The raised portion 24 preferably has a longitudinal axis 48 and a perpendicular lateral axis 50. As shown in FIGS. 1–5, the raised portion 24 is shown to have a rectangular shape, however, it is envisioned that any shape raised portion 24 can be used, such as a square.

In order to quickly and operatively secure the outlet box 10 to the structural support 8, the outlet box 10 includes a mounting aperture 28 or hole. The holding prongs 26 temporarily hold the outlet box 10 in place while the user decides on the final positioning of the outlet box 10 on the structural support 8. In the preferred embodiment there are two holding prongs 26 extending from the mounting surface 22. Referring back to FIG. 3, holding prongs 26 have pointed tips 44 which are used to pierce a wood stud 8. The holding prongs 26 can be aligned along a second longitudinal axis 56 on the mounting surface 22 and spaced a distance from each other on substantially the same linear axis. In a preferred embodiment (not shown), the holding prongs 26 are positioned at opposite corners of the raised portion 24 adjacent the rear wall 12.

The outlet box 10 further includes an aperture 28 that is generally centrally disposed between the pair of holding prongs 26. The aperture 28 can also be positioned a distance away from the holding prongs 26 in a substantially parallel second axis. The aperture 28 can be positioned on a third longitudinal axis 58 on the mounting surface 22 that is positioned between the first longitudinal axis 54 of the positioning tabs 30 and the second longitudinal axis 56 of the holding prongs 26. In the preferred embodiment the aperture 28 is positioned equidistant between the pair of holding prongs 26.

An advantage to the positioning of this particular fastening configuration is that after the prongs 26 are forced to pierce the stud 8, a fastener 46 that projects through the aperture 28 forms a three-point attachment or a triangular shaped attachment for the outlet box 10 to be held onto the stud 8. A further advantage to using the centrally located aperture 28 that is spaced a distance from the linear axis of holding prongs 26 is that the possibility of unwanted pivoting of the outlet box 10 about the aperture 28 is prevented by the holding prongs 26.

Figure 5:
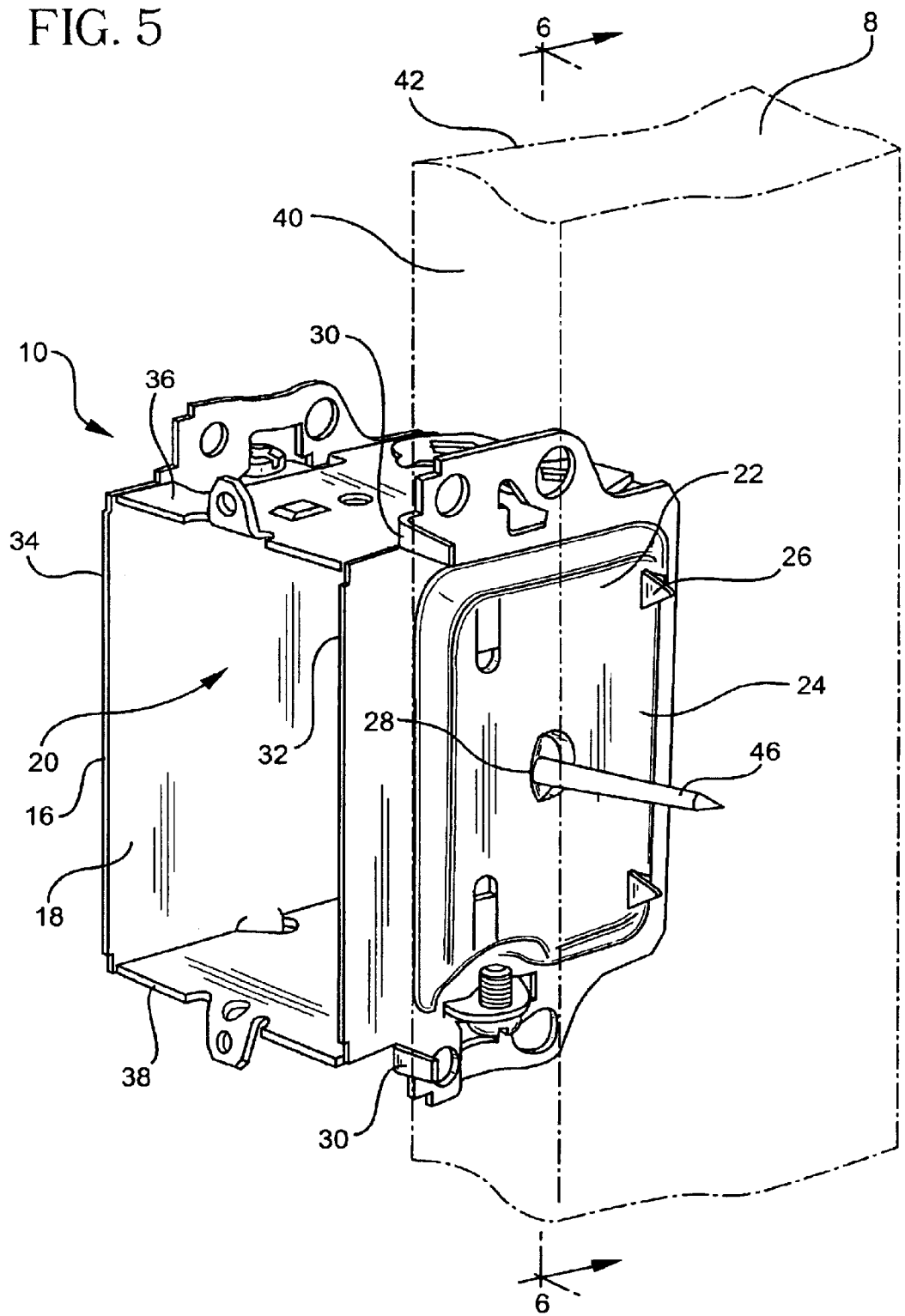
FIG. 5 is a perspective view of the outlet box of the present invention attached to a stud.
Figure 6:
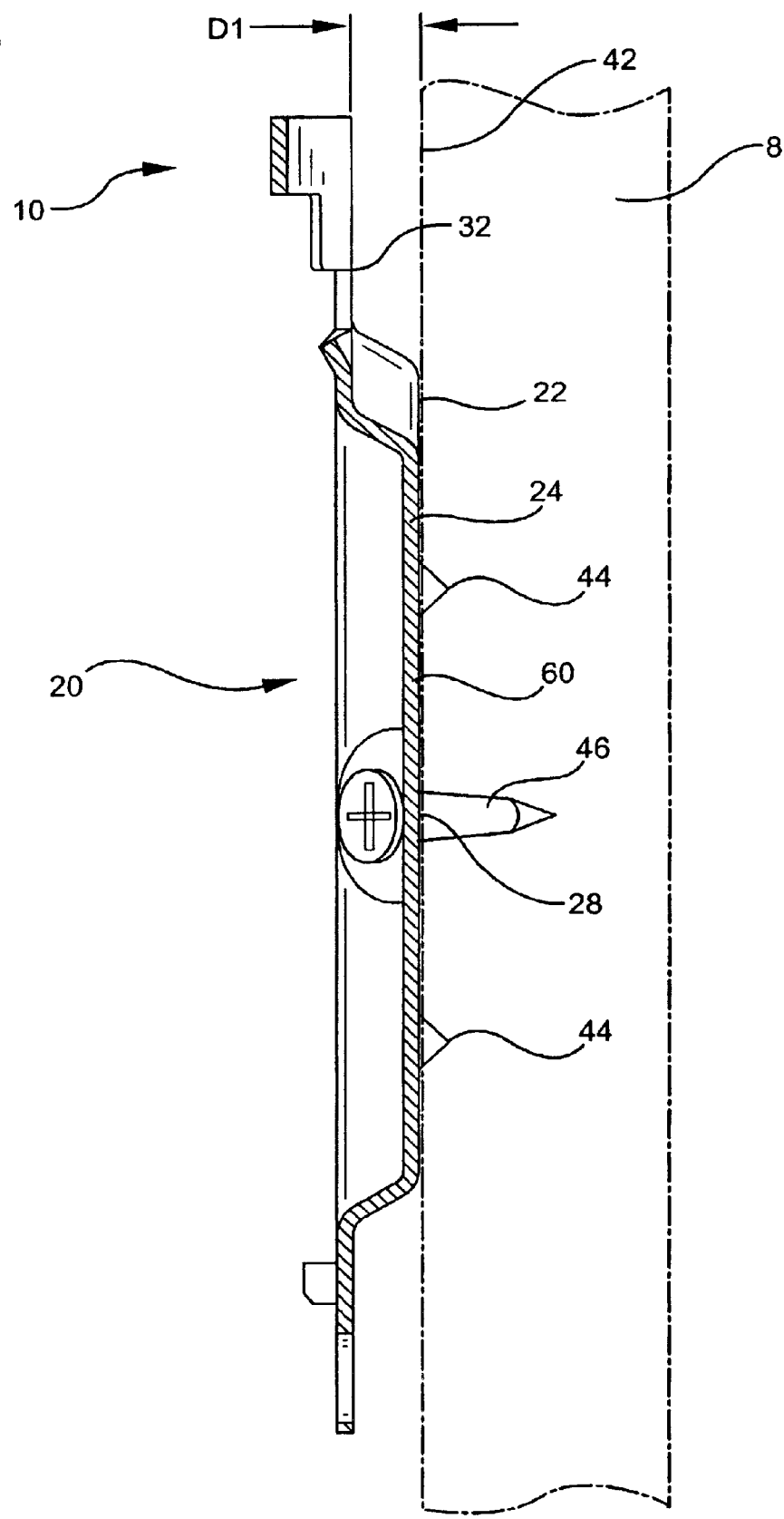
FIG. 6 is a partial cross sectional view of the outlet box of the present invention as shown in FIG. 5 taken along Line 6—6.

Referring to FIGS. 5 and 6, in order to mount the box, the user may first align the positioning tabs 30 so that they are flush with the front face of the stud 40 which can be made of wood. The tabs 30 are positioned flush so that the outlet box opening 18 projects outwardly from the front surface 40 so that a wall covering can be placed over the outlet box opening 18 and a hole can be cut so that the upper rim 16 can project through the wall covering. The user then positions the mounting surface 22 so that it abuts the side surface of the stud 42.

After the outlet box 10 is positioned, the user taps the opposite side of the outlet box 10 so that the holding prongs 26 which project out of the raised portion 24 of the outlet box 10 are then forced to pierce the outer surface of the stud. The action of piercing the outer portion of the stud is done so that the holding prongs 26 frictionally engage the wood stud 8. The outlet box 10 is now held in place by the two holding prongs 26. The user then has both hands available to insert a fastener 46, such as a screw or a nail, through the aperture 28 to operatively secure the outlet box 10 into place. The outlet box 10 is held onto the stud by both holding prongs 26 which prevent pivoting of the outlet box 10 about the aperture 28 and the fastener 46. The outlet box 10 is further prevented from moving by the two positioning tabs 30 which are adjacent the front face of the stud 40 and prevents movement of the box 10 in a pivoting manner about the fastener 46.

Although, holding prongs 26 hold the outlet box 10 to the stud, the fastener 46 is used so that the outlet box is operatively or permanently secured to the stud. The use of a fastener 46 allows the outlet box to be held securely on the stud so that it can retain fixtures, such as switches, and not inadvertently be removed from the stud during use of the fixture.

As shown in FIG. 6, only one fastener 46 is needed to hold the outlet box 10 in place, thus reducing the amount of time it takes to attach the outlet box 10. In addition, the use of the positioning tabs 30 and the holding prongs 26 makes it easy for one who is not familiar with the positioning of the outlet box 10 to properly position the outlet box 10 onto a stud 8 without extensive training or measuring. The use of one screw when used in connection with the pair of holding prongs 26 have been found to properly hold the outlet box 10 onto a stud to pass CSA10 standard without the need for additional fasteners 46. Less hardware and time is needed to properly attach the outlet box 10 thus reducing the cost and time associated with mounting the outlet box 10 securely.

Although preferred embodiments of the present invention have been described herein with reference to the accompanying drawings, it is to be understood that the invention is not limited to those precise embodiments and the various other changes and modifications may be effected herein by one skilled in the art without departing from the scope or spirit of the invention, and that it is intended to claim all such changes and modifications that fall within the scope of the invention.

What is claimed is:

1. An electrical outlet box securable to a support structure comprising:
   a rear wall parametrically bound by an orthogonally extending sidewall terminating at a rim defining an opening in said outlet box,
   said sidewall including a generally planar mounting surface adapted to be abutted against the structural support,
   said mounting surface including an aperture centrally disposed between a pair of prongs, said prongs being securable within the support structure for temporarily securing the outlet box thereto without the need for a fastener; and
   said aperture being adapted to receive a fastener for operatively securing said box to the support structure.

2. An electrical outlet box according to claim 1, further includes a pair of positioning tabs extending from said mounting surface to assist in positing said box in relation to the structural support.

3. An electrical outlet box according to claim 1, wherein said prongs are pointed to assist in piercing an outer surface of the structural support.

4. An electrical outlet box according to claim 2, wherein said aperture is located generally equidistant from each of said prongs.

5. An electrical outlet box according to claim 4, wherein said prongs are aligned in a substantially first linear axis and said aperture is positioned a distance away from said first linear axis in a substantially parallel second axis.

6. An electrical outlet box comprising:
   a rear wall perimetrically bounded by an outwardly extending sidewall forming a box interior, said sidewall terminating at an upper rim;
   said sidewall including a generally planar mounting surface adapted to be abutted against a support structure;
   said mounting surface including a pair of prongs and an aperture generally centrally disposed therebetween, said prongs being securable with the support structure for temporarily securing thereto;
   said aperture being adapted to receive a fastener for securing said outlet box to the support structure; and
   whereby the outlet box is operatively securable to the support structure with only one fastener.

7. An electrical outlet box according to claim 6, further including a pair of positioning tabs extending from said mounting surface aligned along a first longitudinal axis for assisting in positioning said outlet box to the support structure.

8. An electrical outlet box according to claim 7, wherein said prongs are aligned along a second longitudinal axis of said mounting surface spaced a distance away from said positioning tabs.

9. An electrical outlet box according to claim 8, wherein said aperture is disposed in a third longitudinal axis spaced a distance away from and between said first longitudinal axis and said second longitudinal axis.

10. An electrical outlet box according to claim 9, wherein said mounting surface further included a raised portion substantially the size of said mounting surface and said prongs and aperture are disposed on said raised portion.

11. An electrical outlet box according to claim 10, wherein said outlet box is a rectangular shape.

12. An electrical outlet box according to claim 6, wherein said prongs are aligned along a longitudinal axis of said mounting surface.

13. An electrical outlet box according to claim 12, wherein said aperture is disposed a distance away from said longitudinal axis of said prongs and equidistant from said prongs.

14. An outlet box comprising:
   a rear wall;
   a sidewall, said sidewall extending substantially perpendicular from said rear wall, and said sidewall terminating at a rim to define an opening in said outlet box;
   a pair of positioning tabs extending from said sidewall for assisting in positioning said outlet box;
   a first holding prong extending from said sidewall and a second holding prong extending from said sidewall, said first and second holding prongs located along a longitudinal axis on said sidewall; and
   said sidewall having at least one aperture located between said first and second holding prongs.

15. An outlet box as defined in claim 14, wherein said sidewall further includes:
   a first wall extending from said rear wall;
   a second wall oppositely positioned and substantially parallel to said first wall;
   a third wall, said third wall positioned substantially perpendicular to said first wall and said second wall, said third wall connecting said first wall and said second wall; and
   a fourth wall, said fourth wall positioned opposite and substantially parallel to said third wall, said walls forming a substantially rectangular shape.

16. An outlet box as defined in claim 15, wherein said sidewall further includes a raised portion, said raised portion forming a substantially flat surface, said raised portion having a rectangular shape having a longitudinal dimension and a perpendicular lateral dimension, wherein said at least one holding prong is positioned along said longitudinal dimension in a linear line with each other, and
   said raised portion includes said at least one aperture is centrally positioned between said at least one holding prongs.

17. An outlet box as defined in claim 16, wherein there is one aperture.

18. An outlet box as defined in claim 17, wherein said aperture and said prongs are linearly aligned with one another along the longitudinal axis of said raised portion.

* * * * *